Jan. 24, 1967  K. POHLE  3,299,489
TOOL-HOLDER PROVIDED WITH REVERSIBLE CUTTING
TOOL, AND THE TOOL ITSELF
Filed July 10, 1964  3 Sheets-Sheet 1

INVENTOR.
KURT POHLE
BY
J.B. Felshin
attorney

Jan. 24, 1967 K. POHLE 3,299,489
TOOL-HOLDER PROVIDED WITH REVERSIBLE CUTTING
TOOL, AND THE TOOL ITSELF
Filed July 10, 1964 3 Sheets-Sheet 2

INVENTOR.
KURT POHLE
BY
J.B. Felshin
attorney

Jan. 24, 1967 K. POHLE 3,299,489
TOOL-HOLDER PROVIDED WITH REVERSIBLE CUTTING
TOOL, AND THE TOOL ITSELF
Filed July 10, 1964 3 Sheets-Sheet 3
Fig. 6
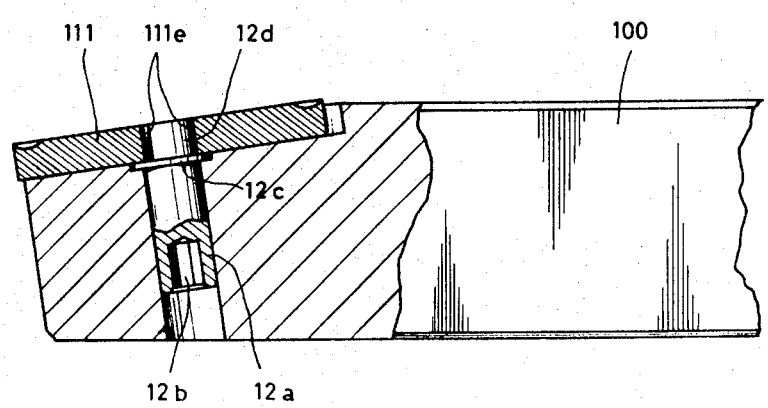
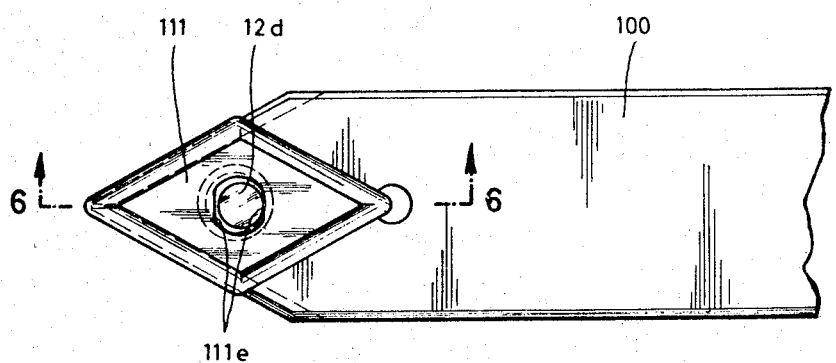
Fig. 5
INVENTOR.
KURT POHLE
BY
J.B. Felshin
attorney

United States Patent Office 3,299,489
Patented Jan. 24, 1967

3,299,489
TOOL-HOLDER PROVIDED WITH REVERSIBLE CUTTING TOOL, AND THE TOOL ITSELF
Kurt Pohle, Stuttgart-Muhlehausen, Germany, assignor to Espa Establishment for Securities and Patents, Vaduz, Liechtenstein, a corporation of Liechtenstein
Filed July 10, 1964, Ser. No. 381,681
5 Claims. (Cl. 29—96)

The present invention relates in general to a tool-holder and cutting tool. It is particularly related to a tool-holder provided with reversible cutting tool, and to the tool itself.

More specifically, the invention discloses a novel cutting tool which is reversible, flat and plate-like and which includes a through-hole through which an eccentrically mounted pin of a rotatable positioning bolt projects. The cutting tool can be positioned in a recess of a tool-holder. The cutting tool has at least two cutting edges which form an angle with respect to each other. The recess of the tool-holder has a set of corresponding limiting edges, so that when the positioning bolt is rotated, the eccentric pin projecting therefrom into the through-hole presses against the inner circumference of the through-hole and thereby firmly positions the cutting tool in the recess of the tool-holder.

Tool-holders having eccentric pins that can rapidly perform a clamping action are already known in the art. The eccentric pin can exert a great force against the rear edge of the cutting tool and thereby firmly holds the cutting tool against a limiting edge in the recess of the tool-holder. There is generally little play in the through-hole of a cutting tool with respect to the eccentric pin projecting therein. Since the eccentric pin executes also a transverse movement when turning, there results, consequently, a corresponding transverse movement of the cutting tool which is entrained along the rear edge of the recess of the tool-holder. The transverse movement of the cutting tool depends on the interplay of some or all of the following factors: the configuration of the eccentric pin, the cutting plate and recess, as well as the size of the force applied to the eccentric pin, the amount of friction generated (i.e. if the wear due to repeated use acts like a lubricant), how resilient the material is, etc. It has been found in practice, however, that the relationship of all of the aforedescribed factors does not remain constant. Therefore, the extent of entrainment of the cutting tool by the eccentric pin varies from case to case. The fact that the cutting tool cannot be accurately positioned and held securely in a predetermined position forms a significant drawback in all the tool-holders known in the art.

It is also known in the art to secure cutting tools in position with eccentric pins in which the diameter of the eccentric pin is smaller than the interior diameter of the through-hole in the cutting tool. In this type of known arrangement, the cutting tool is not inserted into the recess along a plane parallel to one of its sides. On the contrary, the cutting tool partially undergoes the rotational movement of the eccentric pin which affects to a certain degree detrimentally, the cutting tool. It has been found in practice that a tool secured in position in this manner frequently jams so that it is difficult to remove it when the tool is to be shifted into a new position or is to be exchanged.

With the aforedescribed drawbacks in the known cutting tools and tool-holders in view, it is an object of this invention, in order to overcome these drawbacks, to provide a cutting tool with a through-hole, that has at least one flat pressure area against which the eccentric pin can be brought to bear so that the cutting tool can be securely positioned in the recess of the tool-holder.

For best results the flat pressure area plane should be perpendicular to the plane bisecting the angle of the limiting edges of the recess. In this manner the pressure can be uniformly distributed to the limiting edges and symmetrical conditions prevail through the entire assembly.

An object of this invention is to provide a tool-holder of the character described formed with a recess at its end for reception of a reversible, flat plate-like cutting tool, disc or tip which may be placed in the recess in a plurality of angular positions and formed at each corner with two cutting edges running at an angle to each other to contact a corresponding pair of limiting edges extending from said recess, in each of said angular positions, and means to press said cutting edges of the disc against the limiting edges of the recess, to determine the alignment of the cutting disc, and said means comprising a member rotatably mounted on the holder and carrying an eccentric pin, located turnably in said hole, so that when said member is rotated relative to the holder, said eccentric pin will press against an inner surface of the hole.

Another object of this invention is to provide a tool of the character described in which the hole is substantially larger than said pin, and has at least one inner substantially flat surface, and means whereby turning of the member which carries the eccentric pin will move the pin into or out of contact with respect to said flat surface, depending on the direction of turning of said member.

Yet another object of this invention is to provide a tool of the character described in which each flat surface is perpendicular to a line bisecting the angle between a pair of adjacent cutting edges of the tool so that the pressure is evenly divided on said edges to provide for symmetrical balanced clamping.

Still another object of this invention is to provide a tool-holder and tool of the character described in which the hole in the tool has a plurality of substantially straight or flat edges and in which the eccentric pin is round and can be disposed in the hole without contacting an inner edge of the hole.

Yet a further object of this invention is to provide a strong and durable tool-holder and tool of the character described which shall be relatively inexpensive to manufacture, easy to assembly, adjust and clamp and which shall yet be practical and efficient to a high degree in use.

Further details of the invention will be explained in conjunction with an embodiment illustrated in the accompanying drawings and described in the specification, FIG. 1 is a side elevation of a tool-holder with a cutting tool mounted thereon;

FIG. 5 is a plan view of a portion of a tool-holder having mounted thereon a rhombohedrally-shaped cutting tool; and FIG. 6 is a cross-sectional view along line 5—5 of FIG. 5.

Figure 1:
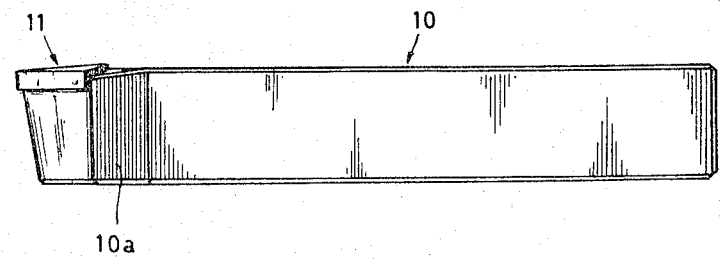
Figure 2:
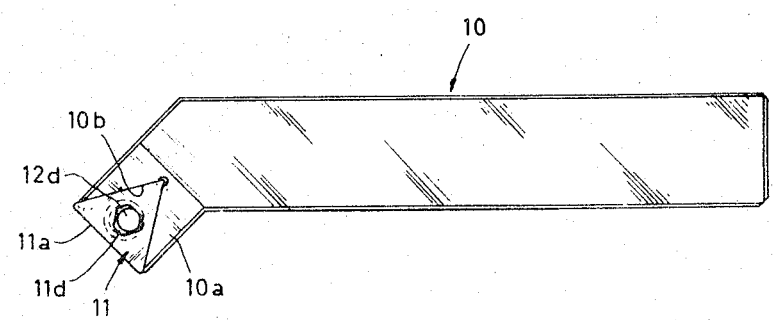
FIG. 2 is a plan view of the device illustrated in FIG. 1.
Figure 4:
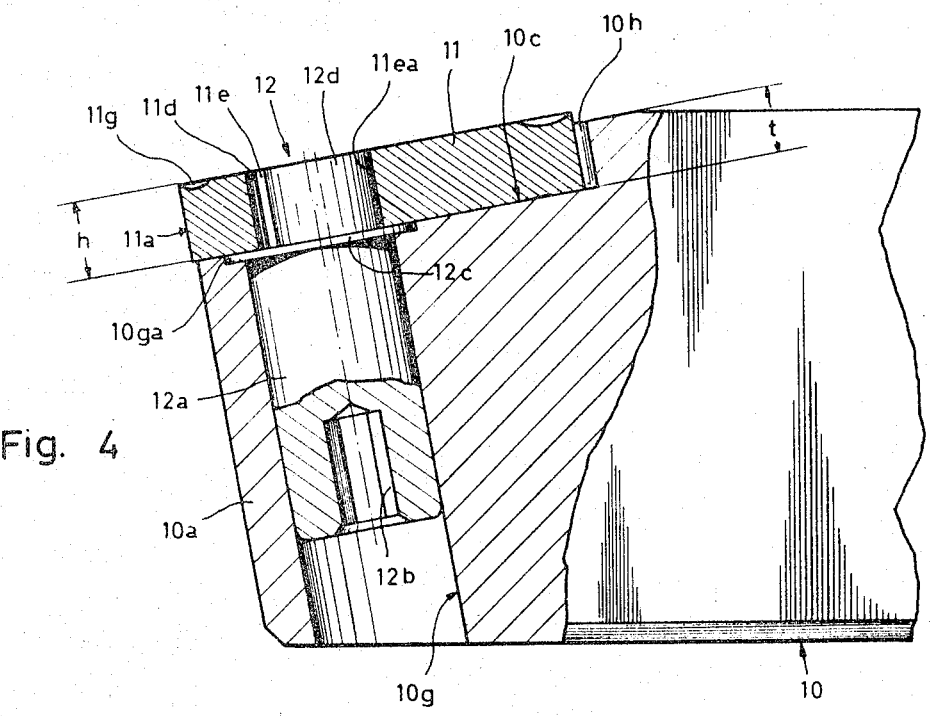
FIG. 4 is a cross-sectional view along line 4—4 of FIG. 3, in reduced scale.

A tool-holder 10 made of square edged material, has at one end thereof an offset portion 10a projecting from the main body of the tool-holder 10 at an obtuse angle. The portion 10a has a triangularly-shaped recess 10b. The bottom 10c of recess 10b extends downwardly at an angle from the top surface of tool-holder 10. The depth $h$ of the recess 10b is of the order of the thickness $h$ of a cutting tool 11. The latter is also triangularly shaped so as to fit into recess 10b. The cutting tool 11 has, however slightly larger dimensions than the recess 10b so that the side edge 11a thereof slightly projects past the end of the offset portion 10a. The cutting tool 11 is securely held in the recess 10b by means described in detail below.

Figure 3:
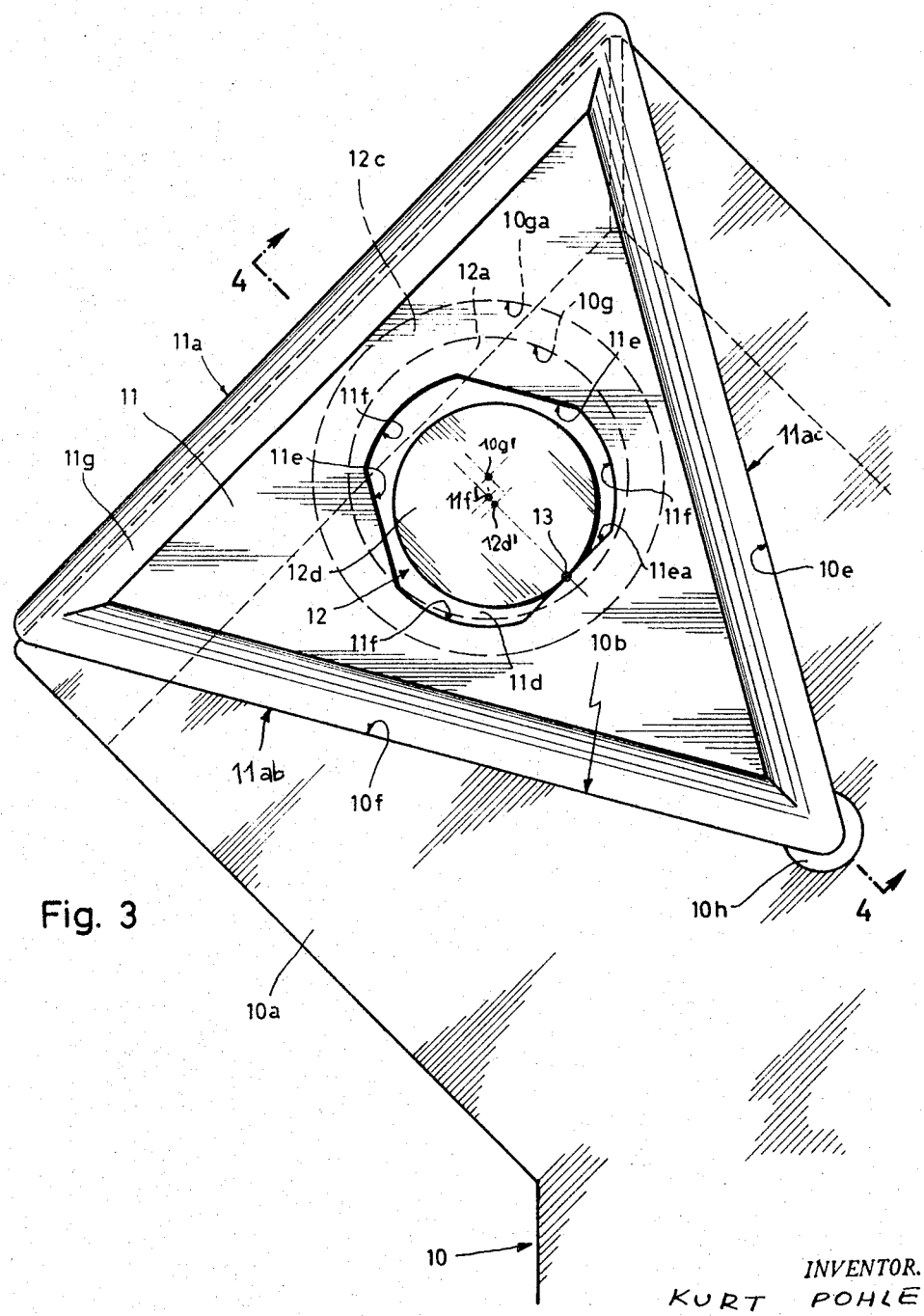
FIG. 3 is an enlarged detail plan view of a portion of the cutting tool and tool-holder.

A two-step bore 10g extends perpendicularly with respect to the bottom 10c through the offset portion 10a. The bore 10g has an upper bore portion 10ga which, when compared to the total length of the bore, is quite short, and which has a larger diameter than the bore 10g. The upper bore portion 10ga extends to and ends at the triangularly-shaped flat bottom surface 10c. The axis 10g' of the two-step bore 10g, 10ga may bisect the angle formed by the limiting edges 10f and 10e of the recess 10b or may be slightly offset therefrom as shown in FIG. 3. A clearance groove 10h is provided at the juncture of the limiting edges 10f and 10e.

A positioning bolt 12 is mounted in the two-step bore 10g, 10ga. The bolt 12 is of unitary construction and includes a shank 12a with a hexagonal bore axially extending therein from its lower end, a top narrow collar portion 12c and an eccentric pin 12d extending upwardly from the collar portion 12c. The latter portion 12c is shaped to fit into the upper bore portion 10ga. Furthermore, when the bolt 12 is fully inserted into the bore 10g, the upper surface of the top collar portion 12c forms one continuous flat surface with the bottom surface 10c of the recess 10b. The cutting tool 11 has the shape of an equilateral triangle and is reversible so that each of its six edges can perform a cutting operation. The eccentric pin 12d extends into a through-hole 11d of the cutting tool 11. The axis 12d' of pin 12d would be on a line bisecting the angle between edges 11ab and 11ac, if the pin were brought to a position where it contacts flat surface 11ea at its longitudinal midpoint 13 as illustrated in FIG. 3. The hole 11d is symmetrically situated with respect to the bisectors of the angles formed by the sides of the triangularly-shaped cutting tool 11, that is to say the axis 11f' of the hole 11d coincides with the line of intersection of the planes bisecting the angles formed by the sides of the cutting tool. The hole 11d has three flat sector portions 11e symmetrically disposed in the hole 11d so that each is perpendicular to a corresponding bisecting plane. The sector portions 11e are joined to each other by three equal circular portions 11f. The axis 11f' of these circular portions 11f bisects the angle formed by the side edges 11ab and 11ac of the tool 11.

The perimeter and eccentricity of the pin 12d is such that the combined configuration of cutting tool 11, hole 11d and offset portion 10a provides for an arrangement in which by turning the positioning bolt 12, the eccentric pin 12d is brought to bear against the sector portion 11ea which is perpendicular to the plane bisecting the limiting edges 10e and 10f. The aforementioned configuration also preferably provides that after the end of the positioning turn by the bolt 12, the angle between the radius of the eccentric pin 12d to the point of contact 13 of the flat sector portion 11ea and the corresponding angle bisecting plane is approximately 20°.

In a symmetrical arrangement of the interacting parts, the cutting tool 11 can be positioned in the recess 10b by turning the bolt 12 either to the left or to the right. The smaller the aforementioned angle between the radius of the eccentric pin 12d and the angle bisecting plane is, the firmer the cutting tool 11 is pressed in position. However, the smaller the aforementioned angle is made, the greater also is the risk that the pin 12d can be overturned.

In the embodiment illustrated in FIGS. 1–4 either one of the limiting edges 10e or 10f may act as a stop (tensioning edge) and the other one as a positioning stop depending on the turning direction of the eccentric pin 12d. The latter pin when turned (tensioned) causes the cutting tool 11 to abut against the positioning stop and to slide along this edge until both cutting tool edges firmly abut against the respective limiting edges of the recess 10b. Due to the special configuration of the through-hole 11d the cutting tool 11 can be positioned without having the eccentric pin 12d effectuate a simultaneous transverse movement on the cutting tool 11 during positioning. In this manner the triangularly shaped cutting tool 11 can always be firmly positioned into the apex groove 10b of the tool-holder 10. By means of the novel structural arrangement of this invention it is possible to easily switch the cutting tool 11 from one operative position to another or to exchange the cutting tool.

FIGS. 5 and 6 illustrate a rhombohedrally shaped cutting tool 111 which is mounted on a suitable tool-holder 100. Since the cutting tool 111 can only be turned into two different operative positions, as opposed to three operative positions for the equilateral triangularly shaped cutting tool 11, there are only two flat sector portions 111e provided in the through-hole.

A square shaped cutting tool would require four corresponding flat sector portions in the through-hole, etc.

In all of the illustrated embodiments the cutting tool is pressed into the angle formed by the sides of the recess in the tool-holder. It is, however, also possible to provide a working model that has a stop along, one limiting edge only. In this arrangement the side edge of the cutting tool is pressed against this one limiting edge in a perpendicular direction thereto.

All of the aforementioned embodiments were described in conjunction with flat sector portions in the positioning hole. It should be noted, however, that this feature is not an absolute requirement. The only absolute design requirement for these sector portions is that those forces acting parallel to the surface of the sector portion during the tensioning turning movement of the eccentric pin are smaller than the positioning forces. That is to say that the forces applied through the eccentric pin that could cause a transverse movement of the cutting tool must be smaller than the forces also applied through the eccentric pin, that cause the sliding and firm positioning of the cutting tool in the recess.

A suitable snap-ring or thread arrangement may be used to maintain the positioning bolt 12 in its position.

The novel means and method for positioning a tool in a rod-shaped tool-holder can also be used in milling, grinding and drilling machines.

Generally, cutting tools made out of sintered hard material (hard metal) are best suited for the structural arrangement of the instant invention. In this type of cutting tool the cutting groove 11g is also pre-shaped during the shaping process of the sintered material.

It will thus be seen that there is provided an apparatus in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative and not in a limiting sense.

What is claimed is:

1. A tool-holder formed wtih a recess at one end, a reversible flat plate-like cutting tool formed with a hole and received in said recess, said cutting tool being formed with two edges disposed at an angle to each other, said holder having corresponding edges disposed at the same angle to each other, to contact said edges of said tool, a member rotatably mounted on said holder and having an eccentric pin projecting into said hole, said hole having at least one substantially flat inner edge portion to be contacted by said pin, when rotating said member, said hole being large enough that said member can be rotated to a position in which said pin is disposed in the hole in spaced relation to the inner edge of said hole, said substantially flat portion of said hole running substantially perpendicular to a line bisecting the angle between said cutting edges of said tool.

2. A flat reversible cutting tool having a plurality of pairs of cutting edges at an angle to one another, each pair of edges forming a corner, said tool being formed with a hole, said hole having inner substantially flat edges substantially perpendicular to lines bisecting the angles between said pairs of edges, said substantially flat edges being tangent to a common circle having an axis lying on lines bisecting said angles.

3. The combination of claim 2, said corners being equiangularly spaced apart.

4. In combination, a tool-holder having a depressed recess forming a flat base surface, said holder being formed with a cylindrical bore extending to said surface, a flat reversible and turnable cutting tool on said surface, said holder having a pair of converging abutment edges at an angle to one another and extending from said base surface, said cutting tool having a plurality of cutting edges forming a plurality of corners, each corner defined by a pair of converging cutting edges at an angle to each other equal to the angle between said abutment edges, said tool being formed with a hole having a plurality of substantially flat edges substantially perpendicular to lines bisecting the angles bounded by pairs of cutting edges, and a member having a shank rotatably mounted in said bore, and an eccentric pin projecting from said shank and into said hole in said cutting tool and adapted to contact only one of said flat edges upon rotating said member, said flat edges being tangent to a common circle having an axis located on lines bisecting the angles of said corners, and said hole being large enough and so positioned that said pin can be disposed therein without contact with the inner edge of said hole and said pin being movable, upon turning said member in one direction, out of contact with an inner flat edge of said hole, and movable upon turning said member in an opposite direction into contact with said inner flat edge of said hole.

5. The combination of claim 4, said pin being circular in cross section and the radius of said common circle being longer than the radius of said pin.

References Cited by the Examiner

UNITED STATES PATENTS

| | | | |
|---|---|---|---|
| 2,877,535 | 3/1959 | Williams | 29—96 |
| 3,084,416 | 4/1963 | Broughton | 29—96 |
| 3,102,326 | 9/1963 | Conti | 29—96 |
| 3,121,939 | 2/1964 | Williams | 29—96 |
| 3,154,974 | 11/1964 | Greenleaf | 29—96 |
| 3,171,188 | 3/1965 | Stier | 29—96 |
| 3,187,406 | 6/1965 | Franko | 29—95 |

FOREIGN PATENTS

| | | |
|---|---|---|
| 831,244 | 3/1960 | Great Britain. |
| 1,126,701 | 3/1962 | Germany. |

WILLIAM W. DYER, JR., *Primary Examiner.*

HARRISON L. HINSON, *Examiner.*